United States Patent
Ueda et al.

(10) Patent No.: US 6,539,916 B2
(45) Date of Patent: Apr. 1, 2003

(54) FUEL INJECTION TIMING CONTROL SYSTEM FOR DIRECT INJECTION TYPE INTERNAL COMBUSTION ENGINE AND METHOD FOR THE SAME

(75) Inventors: Katsunori Ueda, Aichi (JP); Masayuki Takagaki, Aichi (JP); Jun Aoki, Aichi (JP); Joji Matsubara, Aichi (JP); Tadakuni Takeda, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/893,713

(22) Filed: Jun. 29, 2001

(65) Prior Publication Data

US 2002/0007817 A1 Jan. 24, 2002

(30) Foreign Application Priority Data

Jun. 30, 2000 (JP) .......................... 2000-199500

(51) Int. Cl.[7] ................................................ F02B 17/00
(52) U.S. Cl. ..................... 123/295; 123/305; 701/115
(58) Field of Search ................................ 123/295, 299, 123/300, 305, 435, 443; 701/115

(56) References Cited

U.S. PATENT DOCUMENTS

| 5,785,031 | A | * | 7/1998 | Akimoto et al. ............ 123/295 |
| 5,794,586 | A | * | 8/1998 | Oda et al. .............. 123/179.17 |
| 5,970,950 | A | * | 10/1999 | Shimizu et al. ............ 123/295 |
| 6,062,191 | A | * | 5/2000 | Ooba ........................ 123/295 |
| 6,073,606 | A | * | 6/2000 | Shimizu et al. ............ 123/295 |
| 6,085,718 | A | * | 7/2000 | Nishimura et al. ......... 123/295 |
| 6,237,561 | B1 | * | 5/2001 | Takahashi ................... 123/295 |
| 6,374,798 | B1 | * | 4/2002 | Nagai et al. ............... 123/295 |
| 6,397,817 | B1 | * | 6/2002 | Yoshida et al. ......... 123/406.47 |
| 6,401,688 | B2 | * | 6/2002 | Teraji et al. ................ 123/295 |
| 2002/0100453 | A1 | * | 8/2002 | Idogawa et al. ............ 123/305 |

FOREIGN PATENT DOCUMENTS

| JP | 264805 | * | 9/1994 | ........... F02D/41/34 |
| JP | 328990 | * | 11/2000 | ........... F02D/41/06 |
| JP | 82211 | * | 3/2001 | ........... F02D/41/04 |

* cited by examiner

Primary Examiner—Henry C. Yuen
Assistant Examiner—Hai H. Huynh
(74) Attorney, Agent, or Firm—Birch, Stewart, Kolasch & Birch, LLP

(57) ABSTRACT

In a direct injection type engine, capable of switching an injection mode between a compression stroke injection mode for injecting fuel mainly during a compression stroke and an intake stroke injection mode for injecting fuel mainly during an intake stroke; a fuel injection starting timing in the intake stroke is corrected to a retard side as the temperature relating to an internal combustion engine, detected as a parameter representing the tendency of fuel to adhere to the inside of the internal combustion engine, becomes lower. If a required fuel injection volume cannot be injected during the intake stroke injection mode in the corrected fuel injection timing, a timing for injecting remaining fuel to satisfy the required fuel injection volume during a compression stroke following the intake stroke in one combustion cycle is determined. The injection of the fuel is controlled according to the corrected fuel injection timing.

16 Claims, 2 Drawing Sheets

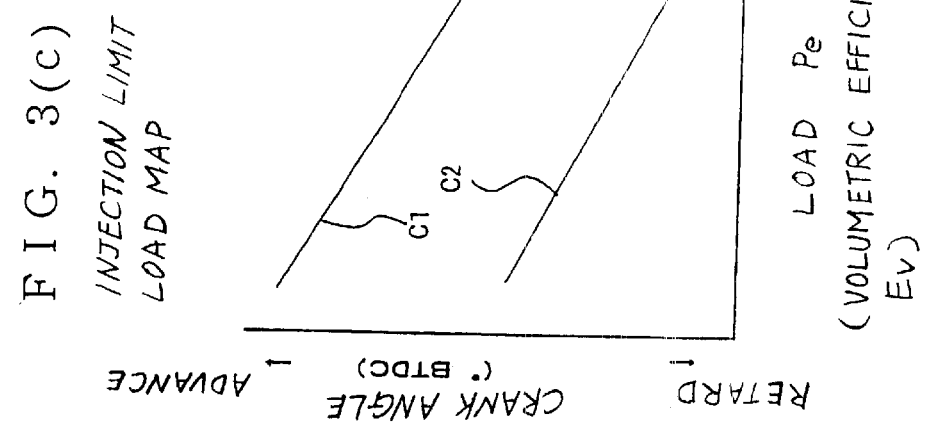
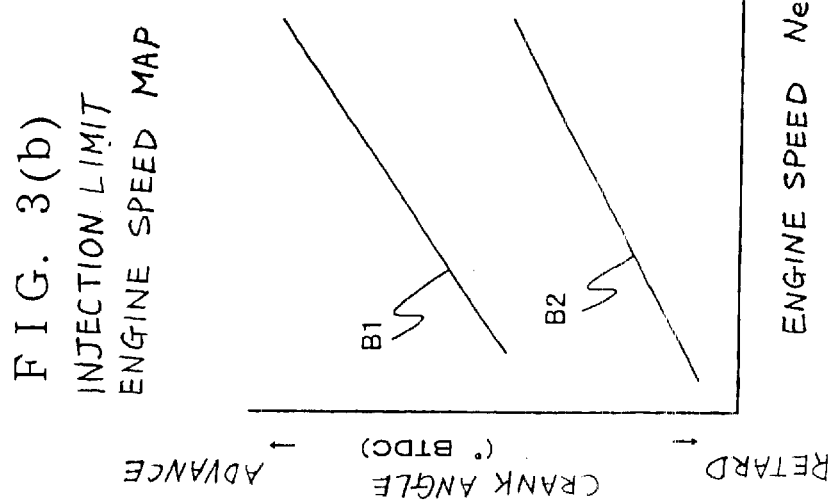
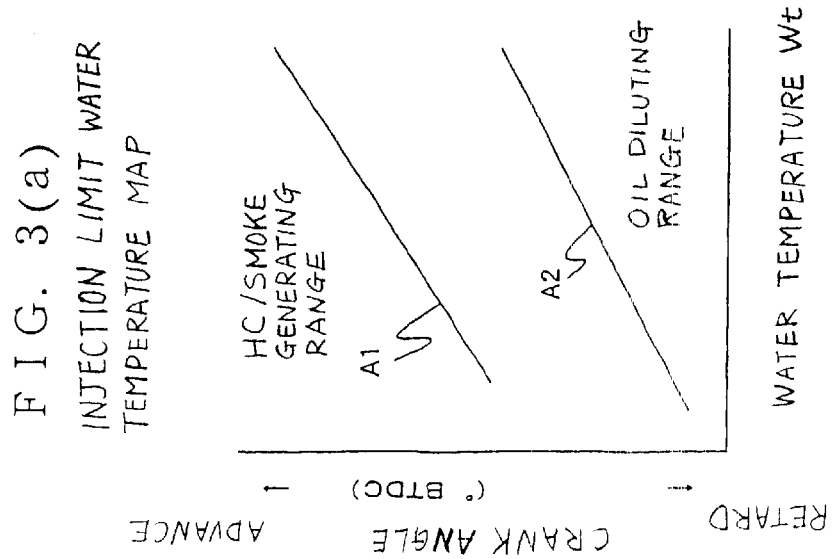

FUEL INJECTION TIMING CONTROL SYSTEM FOR DIRECT INJECTION TYPE INTERNAL COMBUSTION ENGINE AND METHOD FOR THE SAME

CROSS REFERENCE TO RELATED APPLICATION

This nonprovisional application incorporates by reference the subject matter of Application No. 2000-199500 filed in Japan on Jun. 30, 2000, on which a priority claim is based under 35 U.S.C. §119(a).

BACKGROUND OF THE INVENTION

1. Field of the Invention

This invention relates to a fuel injection timing control system and method for a direct injection type internal combustion engine, which is preferable for a spark ignition type four-cycle internal combustion engine.

2. Description of Related Art

Conventionally, a direct injection engine, that injects fuel from a fuel-injecting valve (injector) directly into a cylinder, performs fuel injection during an intake stroke to uniformly mix air and the fuel in the cylinder when a medium load is applied to the engine. If a fuel injection starting timing is early in the intake stroke, a fuel spray collides with the top of a piston to form a fuel film at the top of the piston. This causes a relatively large amount of smoke and HC to be outputted.

If a fuel injection ending timing is late, the fuel spray partially adheres to an inner wall of the cylinder and is absorbed by oil on the inner wall of the cylinder. The absorbed fuel is scraped off by the piston without evaporating. This results in the dilution of oil.

This tendency is striking when an engine is so cold as not to promote evaporation of the fuel.

For the reasons stated above, the direct injection engine needs to perform the fuel injection at a certain limited crank angle when injecting the fuel in the intake stroke. Limiting the fuel injection period in this manner prevents generation of smoke and HC, and the dilution of oil.

If the fuel, corresponding to an intake air volume, is injected while a high load is being applied to the engine (e.g. in a full throttle operation), however, it is impossible to inject all the fuel at the above-mentioned crank angle because the engine is revolving at a high speed. In this case, generation of smoke and HC, and dilution of oil are unavoidable.

Further, if the fuel injection period is limited to such a predetermined period (within the crank angle) as to avoid generation of HC and smoke, and the dilution of oil when the fuel is being injected during the intake stroke, the fuel runs short because the predetermined period varies according to the operational status of the engine.

SUMMARY OF THE INVENTION

It is, therefore, an object of the present invention to provide a direct injection type internal combustion engine capable of properly setting a timing for permitting the fuel injection during the intake stroke to thereby prevent generation of HC and smoke, and the dilution of oil.

To attain the above object, the present invention provides a fuel injection timing control system for a direct injection type internal combustion engine capable of switching a fuel injection mode according to an operational status between a compression stroke injection mode for performing fuel injection mainly during a compression stroke and an intake stroke injection mode for performing fuel injection mainly during an intake stroke, the fuel injection timing control system comprising: a correcting unit that corrects a fuel injection timing in the intake stroke according to parameters representing a tendency of fuel to adhere to an inside of the internal combustion engine, wherein when a fuel injection volume required during the intake stroke injection mode cannot be injected within the fuel injection timing corrected by the correcting unit, the correcting unit sets a timing for injecting remaining fuel during a compression stroke following the intake stroke in one combustion cycle to satisfy the required fuel injection volume; and a control unit that controls injection of fuel into the internal combustion engine according to the fuel injection timing corrected by the correcting unit; wherein the correcting unit detects a temperature relating to the internal combustion engine as a parameter representing the tendency of the fuel to adhere to the inside of the internal combustion engine, and corrects the fuel injection starting timing in said intake stroke to retard side as the detected temperature becomes lower.

This fuel injection timing control system for the direct injection type internal combustion engine reliably prevents generation of HC and smoke, dilution of oil, increases power, and improves fuel economy without increasing cost and weight by a simple structure wherein the fuel injection timing in the intake stroke is corrected according to the parameters representing the tendency of the fuel adhering to the inside of the internal combustion engine. Further, the fuel injection timing control system corrects the fuel injection starting timing in the intake stroke to a retard side as the detected temperature becomes lower. This effectively prevents the generation of HC and smoke, and the dilution of oil, when, for example, the engine is cold started.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3($a$)–3($b$) are diagrams showing the characteristics of a direct injection type internal combustion engine according to the embodiment of the present invention, wherein FIG. 3($a$) shows an injection limit water temperature map that contains a fuel injection starting limit and a fuel injection ending limit determined according to the water temperature, FIG. 3($b$) shows an injection limit Ne map that contains a fuel injection starting limit and a fuel injection ending limit determined according to the revolution speed, and FIG. 3($c$) shows an injection limit load map that contains a fuel injection starting limit and a fuel injection ending limit determined according to the water temperature.

DETAILED DESCRIPTION OF THE PREFERRED EMBODIMENT

A description will hereunder be given of a direct injection type internal combustion engine according to a preferred embodiment of the present invention with reference to the accompanying drawings.

Figure 1:
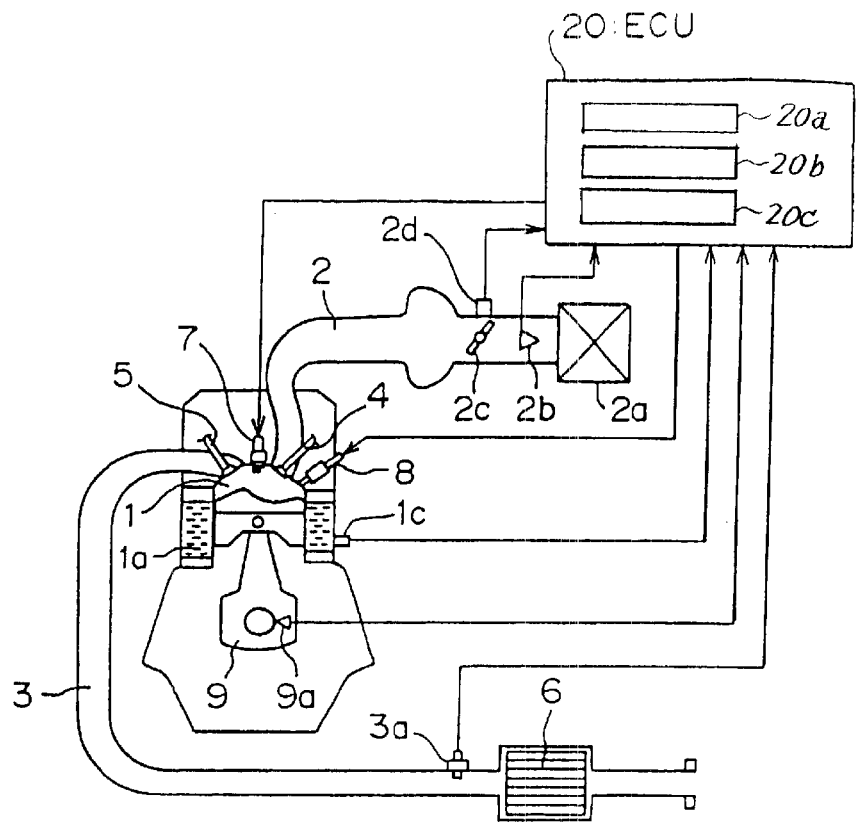
FIG. 1 is a conceptual diagram showing the entire structure of a direct injection type internal combustion engine according to a preferred embodiment of the present invention.
Figure 2:
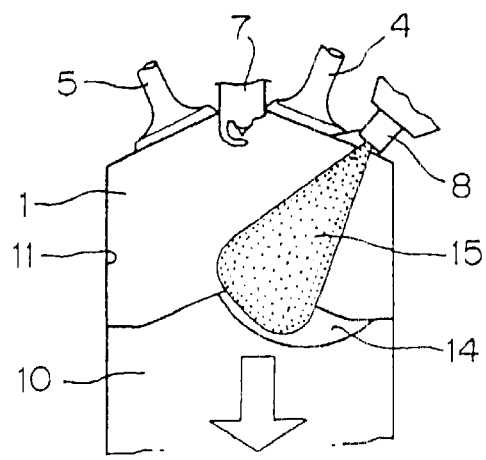
FIG. 2 is a conceptual diagram showing a fuel injection mode of a direct injection type internal combustion engine according to the embodiment of the present invention.

As shown in FIG. 1, a combustion chamber of a direct injection type internal combustion engine (hereinafter referred to as engine) is connected to an intake passage 2 via an intake valve 4 and also connected to an exhaust passage 3 via an exhaust valve 5. An air cleaner 2, an air flow sensor (hereinafter referred to as AFS) 2b that detects an intake air volume, a throttle valve 2c that controls the intake air volume, a throttle position sensor (hereinafter referred to as TPS) that detects an opening angle of the throttle valve 2c, and so forth are disposed in the intake passage 2. An $O_2$ sensor (exhaust sensor) 3a that detects $O_2$ concentration in exhaust gases and a three way catalyst 6 that functions as an exhaust gas purifying catalyst (hereinafter referred to as catalyst) are disposed in the exhaust passage 3.

In the combustion chamber 1, an injector 8 is disposed in such a position that an injection nozzle thereof faces the combustion chamber 1.

With this arrangement, air taken through the air cleaner 2c according to the opening angle of the throttle valve 2c is taken into the combustion chamber 1 via the intake passage 2 and the intake valve 4, and is mixed with fuel injected from the injector 8 according to a signal from an Electronic Control Unit (control unit) 20. An ignition plug 7 is then ignited in a proper timing to burn a mixture, and the exhaust gases are exhausted from the combustion chamber 1 into the exhaust passage 3 via the exhaust valve 5. The exhaust gases are then purified by the catalyst 6 and silenced by a muffler, not shown, and are discharged into the atmosphere.

This engine has not only the above-mentioned AFS 2b, TPS2d and the $O_2$ sensor 3a, but also a catalyst temperature sensor, a crank angle sensor 9a attached to a crank shaft 9, a cooling water temperature sensor 1c inserted in water jacket 1a in a cylinder block to detect the temperature of cooling water in the engine. Information from these sensors is transmitted to the Electronic Control Unit (hereinafter referred to as ECU) 20.

The direct injection engine generates a longitudinal whirl (a clockwise tumble flow in FIG. 1) from the intake air in the combustion chamber 1, injects fuel during a compression stroke to collect a small amount of fuel in proximity of the ignition plug 7, and perform a stratified combustion. If the fuel is injected during the compression stroke, the mixture having an extremely lean air-fuel ratio (lean operation mode), as a whole, is burned (lean burn).

As another mode of the fuel injection, the fuel is injected during an intake stroke. This intake stroke injection mode includes a stoichiometrical operation mode for executing a feedback control according to the sensor information from the $O_2$ sensor 3a (not shown) so that the air-fuel ratio can be close to a stoichiometrical air-fuel ratio, and a rich operation mode for operating the engine at a richer air-fuel ratio than the stoichiometrical air-fuel ratio.

The ECU 20 selects an operation mode among the above-mentioned modes according to the operational status of the engine. More specifically, the ECU 20 calculates an engine load Pe and engine speed Ne according to the sensor information from the TPS 2d and the crank angle sensor 9a, and determines an engine operation mode according to the results of the calculation. As the engine load Pe and the engine speed Ne become higher, the lean operation mode, the stoichiometrical operation mode, and the rich operation mode are set in this order.

When the fuel is injected during the intake stroke, the fuel is injected from the injector into the combustion chamber 1 toward a cavity 14 formed at the top of the piston 10 to thereby form a spray 15. The piston 10 then starts moving upward to agitate the fuel (spray 15) and air. If the piston 10 has reached a point in proximity to a top dead center, the ignition plug 7 is ignited to burn the mixture.

As shown in FIG. 1, the ECU 20 has a fuel injection timing setting device 20a that sets an injection-valve opening period (fuel injection period) of the injector 7 according to a required fuel injection volume, which is calculated according to the operational status of the engine in the respective operating modes, and also sets a fuel injection starting timing or a fuel injection ending timing.

The ECU 20 also has a fuel injection timing control device (control unit) 20b that controls the operation of the injector 8 when the fuel is injected in the fuel injection timing set by the fuel injection timing setting device 20a.

According to the present invention, the ECU 20 also has a fuel injection timing correcting device (correcting unit) 20c that corrects the fuel injection starting timing calculated according to the fuel injection period and the fuel injection ending timing in the intake stroke injection mode set by the fuel injection timing setting device 20a, and sets a timing for injecting the remaining fuel to satisfy the required fuel volume in the subsequent compression stroke in one combustion cycle in case that the fuel of the required fuel volume cannot be injected during the fuel injection period from the corrected fuel injection starting timing to the fuel injection ending timing.

According to information from a water temperature sensor 1c, serving as a temperature detecting device, the fuel injection timing correcting device (correcting unit) 20c corrects the fuel injection starting timing so that the lower the water temperature Wt is, the later is the fuel injection starting timing. The water temperature Wt is one of parameters representing the tendency of the fuel to adhere to the inside (e.g. the cylinder inner wall 11 and the top of the piston 10) of the engine. More specifically, the higher the water temperature Wt is, the higher the evaporation rate of the fuel spray becomes. This prevents the fuel from adhering to the inside of the engine. Moreover, if the water temperature Wt is low e.g. when the engine is cold started, the fuel spray cannot be evaporated sufficiently. If the fuel is injected early in such a case, a liquid film is formed on the surface of the cylinder inner wall 11 to cause the generation of smoke and HC.

To address this problem, when the fuel is injected during the intake stroke, at least the fuel injection starting timing is corrected (changed) according to the water temperature with reference to a map as shown in FIG. 3(a). FIG. 3(a) shows the characteristics of such a fuel injection timing as not to cause the generation of smoke, etc. or the dilution of oil. The characteristics were found by an experiment. The vertical line represents a crank angle (° BTDC), and the horizontal line represents the water temperature Wt. In FIG. 3(a), line A1 indicates a fuel injection starting limit, and line A2 indicates a fuel injection ending limit. The smoke and the HC are generated if the fuel injection is started earlier than the fuel injection starting limit A1, and the oil becomes diluted if the fuel injection is continued after the fuel injection ending limit A2.

As is clear from FIG. 3(a), in order to prevent the generation of smoke and the like, the fuel injection starting timing is corrected so that the lower the water temperature is, the later is the fuel injection starting timing.

Therefore, according to the present embodiment, the fuel injection starting timing is retarded according to the water temperature when the fuel is injected during the intake stroke.

Conventionally, the fuel injection timing setting device 20a sets the required fuel injection volume (fuel injection period) according to the operational status of the engine, and then sets the fuel injection ending timing to make sure that the fuel injection is finished within the intake stroke. The fuel injection starting timing is determined based upon the fuel injection period and the fuel injection ending timing.

For this reason, in the case of a conventional fuel injection controlling operation, the fuel injection starting timing lies in a range at the upper side of the line A1 due to the requirements of the fuel injection period and the fuel injection ending timing. This may cause the generation of smoke and HC.

According to the present embodiment, however, the fuel injection timing correcting device 20c retards the fuel injection starting timing so that at least the fuel injection opening timing, calculated according to the fuel injection period and the fuel injection ending timing, can lie in the range between the line A1 and the line A2 when the fuel is injected during the intake stroke by making use of such characteristics of the direct injection type internal combustion engine that there is an extremely large degree of freedom in the fuel injection controlling operation. More specifically, the fuel injection starting timing is retarded to lie on the fuel injection starting limit line A1 (a timing at the fuel injection starting limit) or a lower range in proximity thereto (a timing that is slightly retarded from the fuel injection starting limit).

Further, according to the present embodiment, if the fuel injection ending timing exceeds the fuel injection ending limit line A2 in FIG. 3(a), the fuel injection is stopped temporarily before the fuel injection ending limit A2 and the remaining fuel is additionally injected during the subsequent compression stroke to satisfy the required fuel volume.

The temperature relating to the engine (internal combustion engine) should not necessarily be restricted to the cooling water temperature Wt. It is possible to apply a wide variety of temperatures relating to the engine (internal combustion engine) such as the temperature of lubricating oil, the temperature of working fluids in various hydraulic devices (e.g. A/T), and the exhaust temperature.

According to the present embodiment, the fuel injection starting timing is also retarded according the engine speed Ne and the load Pe.

FIGS. 3(b) and 3(c) are similar to FIG. 3(a) except that the horizontal lines of those graphs represent the engine speed Ne and the load Pe, respectively. As in the case with FIG. 3(a), FIGS. 3(b) and 3(c) show the characteristics relating to the fuel injection period obtained by an experiment. As shown in FIGS. 3(b) and 3(c), the larger the engine speed Ne or the higher the load Pe is (i.e. the more the fuel injection volume is), the later the fuel injection starting limit and the fuel injection ending limit become. To the contrary, the higher the engine speed Ne is or the lower the load Pe is (i.e. the less the fuel injection volume is), the earlier the fuel injection starting limit and the fuel injection ending limit become. That is, in order to prevent generation of smoke and the like, the fuel injection starting timing is corrected so that the lower the engine speed is or the higher the load is, the later is the fuel injection starting timing.

According to information from a crank angle sensor 9a serving as an engine speed detecting device, the fuel injection timing control device 20a corrects the fuel injection timing so that the lower the engine speed Ne is, the later is the fuel injection timing. More specifically, the fuel injection timing control device 20a retards the fuel injection starting timing to such an extent that it lies on a fuel injection starting limit line B1 in a map (injection limit Ne map) shown in FIG. 3(b) (a timing at the fuel injection starting limit) or in a lower range in proximity thereof (a timing that is slightly retarded from the fuel injection starting limit). Further, according to the present embodiment, if the fuel injection ending timing exceeds a fuel injection ending limit line B2 shown in FIG. 3(b), the fuel injection is temporarily stopped before the fuel injection ending limit B2 and the remaining fuel is additionally injected during the subsequent compression stroke to satisfy the required fuel volume.

Likewise, according to information from an air flow sensor 2b, serving as a load detecting device, the fuel injection timing control device 20a corrects the fuel injection starting timing so that the higher the engine load Pe is, the later is the fuel injection starting timing. The fuel injection timing control device 20a retards the fuel injection starting timing to such an extent that it lies on a fuel injection starting limit line C1 in a map (injection limit load map) shown in FIG. 3(c) (a timing at the fuel injection starting limit) or in a lower range in proximity thereof (a timing that is slightly retarded from the fuel injection starting limit). Further, according to the present embodiment, if the fuel injection ending timing exceeds a fuel injection ending limit line C2 shown in FIG. 3(c), the fuel injection is temporarily stopped before the fuel injection ending limit C2 and the remaining fuel is additionally injected in the subsequent compression stroke to satisfy the required fuel volume.

According to the present embodiment, the volumetric efficiency, calculated according to the information from the air flow sensor 2b, is used as the engine load Pe. Alternatively, however, the accelerator depression angle and the throttle opening angle may be used to represent the engine load Pe.

According to the direct injection type internal combustion engine of the present embodiment constructed in the above-mentioned manner, when the fuel is injected during the intake stroke, the fuel injection timing correcting device 20c corrects (changes) the fuel injection starting timing, which is calculated from the fuel injection period and the fuel injection ending timing, according to the information from various sensors.

More specifically, the fuel injection starting timing is corrected (changed) so that:

the lower the engine water temperature Wt is, the later is the fuel injection starting timing;

the lower the engine speed Ne is, the later is the fuel injection starting timing; and the higher the load is, the later is the fuel injection starting timing.

In this case, the fuel is injected with the fuel injection starting timing being set as the fuel injection starting limit. If all the required fuel cannot be injected before the fuel injection ending limit in the intake stroke injection mode, the fuel injection is temporarily stopped at the fuel injection ending limit and the remaining fuel is injected during the subsequent compression stroke. In this case, the remaining fuel is injected during the middle period of the compression stroke wherein the fuel never adheres to the cylinder inner wall (i.e. the oil never becomes diluted).

As stated above, the direct injection type internal combustion engine of the present embodiment retards the fuel injection starting timing according to the parameters representing the tendency that the fuel adheres to the inside of the engine. This prevents the fuel injection timing from lying in such a range as to cause the generation of HC and smoke, and the dilution of oil.

More specifically, the fuel injection starting timing is corrected so that the lower the temperature is, the later is the fuel injection starting timing. This prevents the generation of HC and smoke, and the dilution of oil, e.g. when the engine is cold started. Moreover, the fuel injection starting timing in the intake stroke injection mode is corrected so that the lower the engine speed is, the later is the fuel injection starting timing. This prevents the generation of HC and smoke, and the dilution of oil, e.g. when the engine is idling. Further, the fuel injection starting timing in the intake stroke injection mode is corrected so that the higher the load is, the later is the fuel injection starting timing. This surely prevents the generation of HC and smoke, and the dilution of oil when the engine is operating under a high load.

In addition, the direct injection type internal combustion engine of the present embodiment is able to burn the fuel surely and cleanly. Thus, the engine can be operated with high power and excellent fuel economy. Moreover, there is no necessity of adding any parts, and this enables the improvements in drivability and fuel economy in actual traffic without increasing the cost or the weight.

It should be understood, however, that there is no intention to limit the invention to the specific forms disclosed, but to the contrary, the invention is to cover all modifications, alternate constructions and equivalents falling within the spirit and scope of the invention as expressed in the appended claims. For example, according to the above embodiment, the temperature (the water temperature Wt) relating to the internal combustion engine, the engine speed Ne, and the engine load Pe (the volumetric efficiency Ev) are applied as parameters representing the tendency of the fuel to adhere to the inside of the engine; however, according to the present invention, the fuel injection starting timing may be changed by using at least one of those parameters. It is needless to say that the fuel injection starting timing may be changed according to other parameters representing the tendency of the fuel to adhere to the inside of the engine.

According to the present embodiment, the fuel injection starting timing is corrected according to at least one of the following parameters: the temperature (the water temperature Wt) relating to the internal combustion engine, the engine speed Ne, and the engine load Pe (the volumetric efficiency Ev), but the fuel injection starting timing may be corrected as follows.

The fuel injection starting timing is corrected according to the fuel injection starting limit determined by using the fast-varying parameters representing the tendency of the fuel to adhere to the inside of the engine, and is further corrected by using a parameter that varies relatively slowly.

First, the fuel injection starting timing is corrected with reference to a map, not shown, using the engine speed (the fast-varying parameter) and the engine load (the fast-varying parameter) as parameters.

Next, the fuel injection starting timing, which has been corrected with reference to the map based upon the engine speed and the engine load, is further corrected according to the temperature relating to the engine (the parameter that varies relatively slowly).

There will now be described a modification example of the direct injection type internal combustion engine according to the embodiment of the present invention.

According to the above-described embodiment, when the fuel is injected during the intake stroke, the fuel injection timing setting device 20a sets the fuel injection period and the fuel injection ending timing with a high priority setting. The fuel injection starting timing is then calculated based upon the fuel injection period and the fuel injection ending timing, and is corrected by the fuel injection timing correcting device 20c to, for example, a point after the fuel injection stating limit line A1 in FIG. 3(a).

On the other hand, in the modification example, when the fuel is injected during the intake stroke, the fuel injection timing setting device 20a calculates the necessary fuel injection volume according to the operational status of the engine, and determines the valve opening period (the fuel injection period) of the injector 8 according to the fuel injection volume. For example, the setting of the fuel injection starting timing is determined with a high priority according to, for example, the fuel injection starting limit line A1 in FIG. 3(a). The fuel injection ending timing is calculated according to the fuel injection period and the fuel injection starting timing.

The fuel injection starting timing is corrected (changed) according to the fuel starting limit lines A1, B1, and C1 shown in FIGS. 3(a)–3(c) so that:

the lower the engine water temperature Wt is, the later the fuel injection is;

the lower the engine speed Ne is, the later the fuel injection starting timing is; and the higher the engine load is, the later the fuel injection timing is.

In the modification example, as is in the case with the above-described embodiment, if the fuel injection ending timing exceeds the fuel injection ending limit line A1 shown in FIG. 3(a), the fuel injection is stopped temporarily before the fuel injection ending limit A2 and the remaining fuel is additionally injected during the subsequent compression stroke to satisfy the required fuel volume.

In another modification example, the fuel injection timing setting device 20a sets the fuel injection starting timing and the fuel injection ending timing with a high priority according to the fuel injection starting limit line A1 and the fuel injection ending limit line A2 shown in FIG. 3(a) in the intake stroke injection mode. If the fuel of the required injection volume cannot be injected due to the operational status of the engine during the fuel injection period from the fuel injection starting timing to the fuel injection ending timing, the remaining fuel may be additionally injected during the subsequent compression stroke to satisfy the required fuel volume.

What is claimed is:

1. A fuel injection timing control system for a direct injection internal combustion engine, which is capable of switching a fuel injection mode between a compression stroke injection mode for injecting fuel mainly during a compression stroke and an intake stroke injection mode for injecting fuel mainly during an intake stroke, comprising:

a correcting unit that corrects a fuel injection timing in said intake stroke according to at least one parameter representing a tendency of fuel to adhere to an inside of said internal combustion engine, wherein when it is impossible to inject fuel of a fuel injection volume required in said intake stroke injection mode in the fuel injection timing corrected by said correcting unit, said correcting unit sets a timing for injecting remaining fuel during a compression stroke following said intake stroke in one combustion cycle to satisfy said required fuel injection volume; and a control unit that controls injection of fuel into said internal combustion engine according to the fuel injection timing corrected by said correcting unit, wherein said correcting unit detects a temperature relating to said internal combustion engine as a parameter representing the tendency of the fuel to adhere to the inside of said internal combustion engine, and corrects the fuel injection starting timing in said intake stroke to retard side as the detected temperature becomes lower.

2. A fuel injection timing control system for a direct injection internal combustion engine according to claim 1, wherein
said correcting unit detects a revolution speed of said internal combustion engine as a parameter representing the tendency that the fuel adheres to an inside of said internal combustion engine, and corrects the fuel injection starting timing in said intake stroke to retard side as the detected revolution speed becomes lower.

3. A fuel injection timing control system for a direct injection internal combustion engine according to claim 1, wherein
said correcting unit detects a load of said internal combustion engine as a parameter representing the tendency of the fuel to adhere to the inside of said internal combustion engine, and corrects the fuel injection starting timing in said intake stroke to retard side as the detected engine speed becomes higher.

4. A fuel injection timing control system for a direct injection internal combustion engine according to claim 1, wherein
said correcting unit detects an engine speed and load of said internal combustion engine and the temperature relating to said internal combustion engine as parameters representing the tendency of the fuel to adhere to the inside of said internal combustion engine, and corrects the fuel injection starting timing in said intake stroke to retard side as the detected revolution speed becomes lower, and corrects the fuel injection starting timing in said intake stroke to the retard side as the detected engine speed becomes higher.

5. A fuel injection timing control system for a direct injection internal combustion engine according to claim 1, wherein
said correcting unit detects an engine speed and load of said internal combustion engine, varying faster than said temperature, as parameters representing the tendency of the fuel to adhere to the inside of said internal combustion engine, and corrects the fuel injection starting timing in said intake stroke according to the detected engine speed and load and further corrects the corrected fuel injection starting timing according to the detected temperature.

6. A fuel injection timing control system for a direct injection internal combustion engine according to claim 1, wherein
said internal combustion engine includes a fuel injection timing setting device that sets a fuel injection starting timing according to a fuel injection period and a fuel injection ending timing corresponding to a fuel injection volume required in said intake stroke injection mode, wherein
said correcting unit includes an injection limit map that stores a fuel injection starting limit determined according to the parameter representing the tendency of the fuel to adhere to the inside of said internal combustion engine, and corrects the fuel injection starting timing according to said injection limit map and the parameter representing the tendency of the fuel to adhere to the inside of said internal combustion engine.

7. A fuel injection timing control system for a direct injection internal combustion engine according to claim 1, wherein
said internal combustion engine includes a fuel injection timing setting device that sets a fuel injection ending timing according to a fuel injection period and a fuel injection starting timing corresponding to a fuel injection volume required in said intake stroke injection mode, wherein
said correcting unit includes an injection limit map that stores a fuel injection starting limit determined according to the parameter representing the tendency of the fuel to adhere to the inside of said internal combustion engine, and corrects the fuel injection starting timing according to said injection limit map and the parameter representing the tendency of the fuel to adhere to the inside of said internal combustion engine.

8. A fuel injection timing control system for a direct injection internal combustion engine according to claim 1, wherein
said correcting unit includes an injection limit map that contains a fuel injection starting limit and a fuel injection ending limit determined according to parameters representing the tendency of the fuel to adhere to the inside of said internal combustion engine, and sets the fuel injection starting timing and the fuel injection ending timing in said intake stroke injection mode according to said injection limit map and the parameters representing the tendency of the fuel to adhere to the inside of said internal combustion engine.

9. A fuel injection timing controlling method for a direct injection internal combustion engine, which is capable of switching a fuel injection mode between a compression stroke injection mode for injecting fuel mainly during a compression stroke and an intake stroke injection mode for injecting fuel mainly during an intake stroke, comprising:
detecting a temperature relating to said internal combustion engine as a parameter representing a tendency of fuel to adhere to an inside of said internal combustion engine;
correcting a fuel injection timing in said intake stroke to retard side as the detected temperature becomes lower;
setting a timing for injecting remaining fuel in a compression stroke following said intake stroke in one combustion cycle to satisfy said required fuel injection volume when it is impossible to inject fuel of a fuel injection volume required in said intake stroke injection mode in the corrected fuel injection timing; and
controlling injection of fuel into said internal combustion engine according to the corrected fuel injection timing.

10. A fuel injection timing controlling method for a direct injection internal combustion engine according to claim 9, further comprising:
detecting an engine speed of said internal combustion engine as a parameter representing a tendency of fuel to adhere to said internal combustion engine; and
correcting a fuel injection starting timing in said intake stroke to retard side as the detected engine speed becomes lower.

11. A fuel injection timing controlling method for a direct injection internal combustion engine according to claim 9, further comprising:
detecting a load of said internal combustion engine as a parameter representing the tendency of the fuel to adhere the inside of said internal combustion engine; and
correcting the fuel injection starting timing in said intake stroke to retard side as the detected engine speed becomes higher.

12. A fuel injection timing controlling method for a direct injection internal combustion engine according to claim 9, further comprising:

detecting an engine speed and load of said internal combustion engine and the temperature relating to said internal combustion engine as parameters representing the tendency of the fuel to adhere to the inside of said internal combustion engine; and correcting the fuel injection starting timing in said intake stroke to retard side as the detected engine speed becomes lower, and correcting the fuel injection starting timing in the intake stroke to retard side as the detected load becomes higher.

13. A fuel injection timing controlling method for a direct injection internal combustion engine according to claim 9, further comprising:

detecting an engine speed and load of said internal combustion engine, varying faster than said temperature, as parameters representing the tendency of the fuel to adhere to the inside of said internal combustion engine; and correcting the fuel injection starting timing in said intake stroke according to the detected engine speed and load and further correcting the corrected fuel injection starting timing according to the detected temperature.

14. A fuel injection timing controlling method for a direct injection internal combustion engine according to claim 9, further comprising:

setting a fuel injection starting timing according to a fuel injection period and a fuel injection ending timing corresponding to a fuel injection volume required in said intake stroke injection mode;

storing, in an injection limit map, a fuel injection starting limit determined according to the parameter representing the tendency of the fuel to adhere to the inside of said internal combustion engine; and correcting the fuel injection starting timing according to said injection limit map and the parameter representing the tendency of the fuel to adhere to the inside of said internal combustion engine.

15. A fuel injection timing controlling method for a direct injection internal combustion engine according to claim 9, further comprising:

setting a fuel injection ending timing according to a fuel injection period and a fuel injection starting timing corresponding to a fuel injection volume required in said intake stroke injection mode;

storing, in an injection limit map, a fuel injection starting limit determined according to the parameter representing the tendency of the fuel to adhere to the inside of said internal combustion engine; and correcting the fuel injection starting timing according to said injection limit map and the parameter representing the tendency of the fuel to adhere to the inside of said internal combustion engine.

16. A fuel injection timing controlling method for a direct injection internal combustion engine according to claim 9, further comprising:

providing an injection limit map that stores a fuel injection starting limit and a fuel injection ending limit determined according to parameters representing the tendency of the fuel to adhere to the inside of said internal combustion engine; and setting the fuel injection starting timing and the fuel injection ending timing in said intake stroke injection mode according to said injection limit map and the parameters representing the tendency of the fuel to adhere to the inside of said internal combustion engine.

* * * * *